United States Patent
Ike

(10) Patent No.: US 9,388,911 B2
(45) Date of Patent: Jul. 12, 2016

(54) VALVE APPARATUS

(75) Inventor: Daisuke Ike, Tokyo (JP)

(73) Assignee: NEC Corporation, Tokyo (JP)

( * ) Notice: Subject to any disclaimer, the term of this patent is extended or adjusted under 35 U.S.C. 154(b) by 131 days.

(21) Appl. No.: 14/346,953

(22) PCT Filed: Sep. 3, 2012

(86) PCT No.: PCT/JP2012/072349
§ 371 (c)(1),
(2), (4) Date: Mar. 24, 2014

(87) PCT Pub. No.: WO2013/047096
PCT Pub. Date: Apr. 4, 2013

(65) Prior Publication Data
US 2014/0239213 A1 Aug. 28, 2014

(30) Foreign Application Priority Data

Sep. 26, 2011 (JP) .................................. 2011-208498
Jul. 31, 2012 (JP) .................................. 2012-169939

(51) Int. Cl.
*F16K 41/12* (2006.01)
*F16K 27/02* (2006.01)
(Continued)

(52) U.S. Cl.
CPC ......... *F16K 27/0281* (2013.01); *F16K 31/0686* (2013.01); *F16K 31/0689* (2013.01);
(Continued)

(58) Field of Classification Search
CPC ............ F16K 31/0686; F16K 31/0689; F16K 31/0696; F02M 19/122; F02M 2200/304; F02M 2200/315; F02M 57/025; Y10T 137/87113
See application file for complete search history.

(56) References Cited

U.S. PATENT DOCUMENTS 3,638,670 A * 2/1972 Allen ........................ F15B 3/00
137/85
3,881,685 A * 5/1975 Hase ...................... F02M 3/062
123/320
(Continued)

FOREIGN PATENT DOCUMENTS

CN 1372078 A 10/2002
CN 1594854 A 3/2005
(Continued)

OTHER PUBLICATIONS

Chinese Office Action dated Feb. 4, 2015, with a partial English translation.
(Continued)

*Primary Examiner* — Matthew W Jellett
(74) *Attorney, Agent, or Firm* — McGinn IP Law Group, PLLC

(57) ABSTRACT

A valve apparatus includes valve box, valve shaft, first flexible film, and second flexible film. The valve box includes inlet and outlet, and forms a space therein for housing the fluids. The valve shaft is inserted into through-hole formed in the wall of the valve box, and moves in the longitudinal direction of the through-hole to move valve body in order to block the flow of the fluids from inlet to outlet. The first flexible film includes a through-hole into which the valve shaft is inserted. The outer peripheral end of the first flexible film is fixed to the peripheral edge of the through-hole, and the peripheral edge of the through-hole of the first flexible film is fixed to the outer periphery of the valve shaft to close the gap between the through-hole and the valve shaft. The second flexible film forms a part of the wall of valve box.

7 Claims, 10 Drawing Sheets

(51) Int. Cl.
  *F16K 31/06* (2006.01)
  *F02M 19/12* (2006.01)
  *F02M 57/02* (2006.01)

(52) U.S. Cl.
  CPC ............. *F16K31/0696* (2013.01); *F16K 41/12* (2013.01); *F02M 19/122* (2013.01); *F02M 57/025* (2013.01); *F02M 2200/315* (2013.01)

(56) References Cited

U.S. PATENT DOCUMENTS

| | | | | |
|---|---|---|---|---|
| 3,991,788 | A | * | 11/1976 | Kull .................. B67D 1/12 137/637.1 |
| 6,623,256 | B2 | | 9/2003 | Takagi et al. |
| 8,011,389 | B2 | * | 9/2011 | Hanada ............... F16K 11/20 137/637.1 |
| 2005/0098164 | A1 | | 5/2005 | Akao et al. |

FOREIGN PATENT DOCUMENTS

| | | |
|---|---|---|
| CN | 201206642 Y | 3/2009 |
| CN | 101725720 A | 6/2010 |
| JP | 55-22596 U | 2/1980 |
| JP | 58-51174 B2 | 11/1983 |
| JP | 60-85679 U | 6/1985 |
| JP | 63-45470 U | 3/1988 |
| JP | 63-106478 A | 5/1988 |
| JP | 09-245507 A | 9/1997 |
| JP | H10-259764 A | 9/1998 |
| JP | 2004-185831 A | 7/2004 |
| JP | 2006-138401 A | 6/2006 |
| JP | 2006-308105 A | 11/2006 |
| JP | 2010-255831 A | 11/2010 |
| JP | 2011-033074 A | 2/2011 |

OTHER PUBLICATIONS

International Search Report (ISR) (PCT Form PCT/ISA/210), in PCT/JP2012/072349, dated Oct. 9, 2012.

* cited by examiner

VALVE APPARATUS

TECHNICAL FIELD

The present invention relates to a valve apparatus, and more particularly to a valve apparatus that adjusts the flow rate from a fluid device.

BACKGROUND ART

There is known a valve apparatus disposed in a fluid device such as a pump, and configured to adjust the flow rate of fluids supplied from the fluid device. FIG. 1 is a schematic diagram showing the related valve apparatus disposed in the fluid device.

As shown in FIG. 1, valve apparatus 1 includes valve box 5 including inlet 2, outlet 3, and valve seat 4. Valve seat 4 is disposed in valve box 5. Inlet 2 is connected to a pump not shown, and fluid 6 is supplied from the pump through inlet 2 to valve box 5. An opening is formed in valve seat 4, and fluid 6 that flows in from inlet 2 passes through the opening to flow to outlet 3.

Valve apparatus 1 further includes valve body 7 for opening/closing the opening of valve seat 4 in valve box 5. Valve body 7 is connected to actuator 9 via valve shaft 8, and actuator 9 moves valve body 7 to open/close the opening of valve seat 4.

The operation of valve apparatus 1 and the flow rate of fluid 6 flowing out from outlet 3 of valve apparatus 1 will be described, referring to FIGS. 2A to 2E and FIG. 3. FIGS. 2A to 2E illustrate the operation of valve apparatus 1, and FIG. 3 is a graph showing the time-sequential change of the flow rate of fluid 6 that flows out from outlet 3 of valve apparatus 1.

As shown in FIG. 2A, in a state in which the opening of valve seat 4 has been closed by valve body 7, fluid 6 does not flow out from outlet 3 (period P1 shown in FIG. 3). As shown in FIG. 2B, actuator 9 moves valve body 7 in a direction such that the opening of valve seat 4 is opened in order to increase the flow rate of fluid 6 from outlet 3 (period P2 shown in FIG. 3).

When the opening of valve seat 4 is opened and the movement of valve body 7 stops (FIG. 2C), fluid 6 flows out from outlet 3 at a certain flow rate (period P3 shown in FIG. 3). Actuator 9 moves valve body 7 in a direction for closing valve seat 4 from the state shown in FIG. 2C, and then the flow rate of fluid 6 that flows out from outlet 3 is reduced (FIG. 2D and period P4 shown in FIG. 3).

As shown in FIG. 2E, valve body 7 closes the opening of valve seat 4, and therefore no more fluid 6 flows from outlet 3 (period P5 shown in FIG. 3).

Actuator 9 is usually disposed outside valve box 5. In such a valve apparatus 1, as shown in FIG. 1, valve shaft 8 is inserted into through-hole 10 formed in the wall of valve box 5. Valve apparatus 1 includes sealing member 11 such as an O-ring or a V gasket for closing the gap between valve shaft 8 and through-hole 10. FIG. 4 is an expanded sectional view showing the periphery of through-hole 10 of valve apparatus 1 where the O-ring is used as sealing member 11.

As shown in FIG. 4, sealing member 11 consisting of the O ring is in contact with valve shaft 8. Accordingly, when valve shaft 8 moves, valve shaft 8 or sealing member 11 is easily worn. Wear debris generated by the abrasion of valve shaft 8 or sealing member 11 enters fluid 6, thus causing the fluid including the wear debris to flow out from outlet 3.

As technology to solve the problem, JP2011-33074A (hereinafter, referred to as "Patent Literature 1") discloses an example of a valve apparatus that uses, as sealing member 11, a flexible film such as a diaphragm.

FIG. 5 is a schematic diagram showing valve apparatus 12 where a flexible film is used as a sealing member. Components similar to those shown in FIG. 1 are denoted by similar reference numerals, and will be described.

As shown in FIG. 5, valve apparatus 12 includes flexible film 13 disposed in through-hole 10. A hole is formed in flexible film 13, and valve shaft 8 is inserted into the hole. The peripheral edge of the hole of flexible film 13 is fixed to the outer periphery of valve shaft 8, and the outer peripheral end of flexible film 13 is fixed to the peripheral edge of through-hole 10.

In valve apparatus 12 disclosed in Patent Literature 1, flexible film 13 moves integrally with valve shaft 8. Accordingly, even when valve shaft 8 moves, valve shaft 8 is not worn, therefore wear debris is not generated. Thus, the incursion of impurities into fluid 6 can be prevented.

CITATION LIST

Patent Literature 1: JP2011-33074A

SUMMARY OF INVENTION

Problems to be Solved by Invention

However, in valve apparatus 12 disclosed in Patent Literature 1, the movement of valve shaft 8 is accompanied by the deformation of flexible film 13. Consequently, the flow rate of fluid 6 that flows out from outlet 3 of valve apparatus 12 may fluctuate. The fluctuation in the flow rate of fluid 6 will be described referring to FIGS. 5 and 6.

FIG. 6 is a graph showing the time-sequential change of the flow rate of fluid 6 from outlet 3 of valve apparatus 12. In the graph shown in FIG. 6, a solid line indicates a change in the flow rate of valve apparatus 12 (FIG. 5) where through-hole 10 is closed by using flexible film 13, and a chain line indicates a change in the flow rate of valve apparatus 1 (FIG. 1) where through-hole 10 is closed by using the O ring.

When valve shaft 8 is moved in the direction for opening the opening of valve seat 4, in other words, when valve shaft 8 moves in a direction of being pushed into valve box 5, flexible film 13 is also pushed into valve box 5 to reduce the volume of valve box 5. Accordingly, fluid 6 that remains in valve box 5 flows out from outlet 3 by an amount equal to the reduction of the volume of valve box 5. As a result, the flow rate of valve apparatus 12 (FIG. 5) in period P2 is higher than that in valve apparatus 1 (FIG. 1).

When valve shaft 8 is moved in the direction for closing the opening of valve seat 4, flexible film 13 is pulled out from valve box 5 to increase the volume of valve box 5. Accordingly, a part of fluid 6 fed from the pump (not shown) stays in valve box 5. As a result, the flow rate of valve apparatus 12 (FIG. 5) in period P4 is lower than that in valve apparatus 1 (FIG. 1).

It is therefore an object of the present invention to provide a valve apparatus that can prevent fluctuation in the flow rate without causing wear debris of the valve shaft to enter the fluids.

Solution to Problem

To achieve the object, according to an aspect of the present invention, a valve apparatus includes a valve box, a valve shaft, a first flexible film, and a second flexible film. The valve box includes an inlet and an outlet, and forms a space therein for housing fluids. The valve shaft is inserted into a through-hole formed in the wall of the valve box, and moves in the longitudinal direction of the through-hole to move a valve body to block the flow of the fluids from flowing into the space from the inlet and from flowing out from the outlet. The first flexible film includes a through-hole into which the valve shaft is inserted. The outer peripheral end of the first flexible film is fixed to the peripheral edge of the through-hole of the valve box, and the peripheral edge of the through-hole of the first flexible film is fixed to the outer periphery of the valve shaft to close a gap between the through-hole of the valve box and the valve shaft. The second flexible film forms a part of the wall of the valve box.

Effects of Invention

According to the valve apparatus of the present invention, fluctuation in the flow rate can be prevented without causing wear debris of the valve shaft to enter the fluids

DESCRIPTION OF EXEMPLARY EMBODIMENTS

Figure 1:
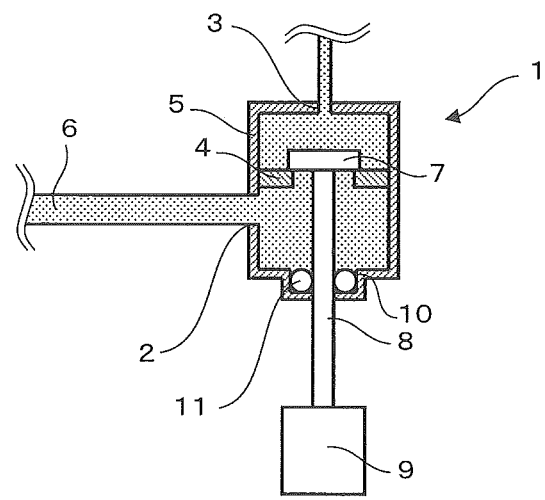
FIG. 1 is a schematic diagram showing a related valve apparatus.
Figure 2A:
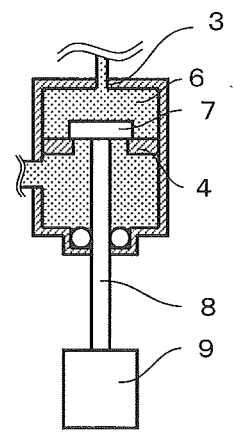
FIG. 2A is a diagram illustrating the operation of the related valve apparatus.
Figure 2B:
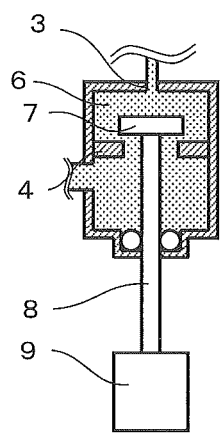
FIG. 2B is a diagram illustrating the operation of the related valve apparatus.
Figure 2C:
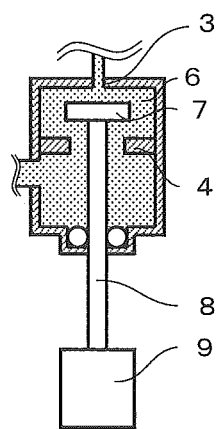
FIG. 2C is a diagram illustrating the operation of the related valve apparatus.
Figure 2D:
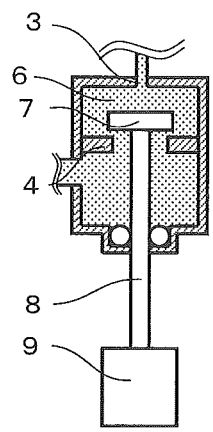
FIG. 2D is a diagram illustrating the operation of the related valve apparatus.
Figure 2E:
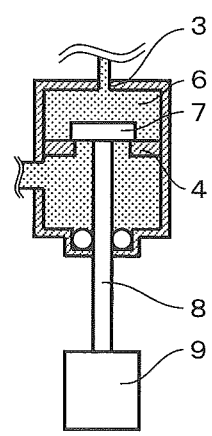
FIG. 2E is a diagram illustrating the operation of the related valve apparatus.
Figure 3:
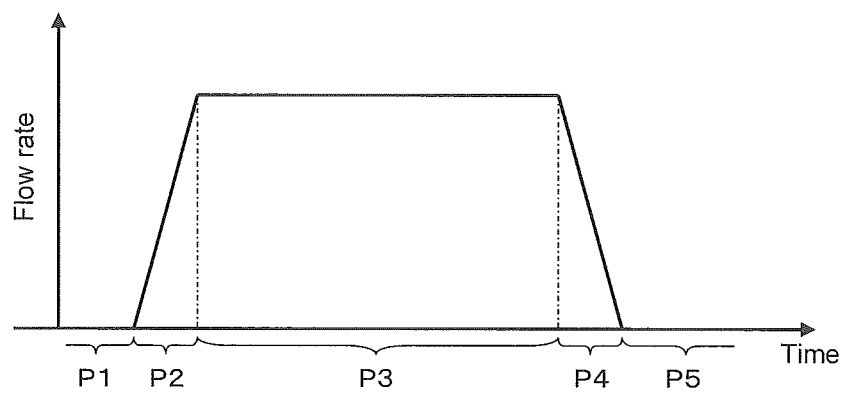
FIG. 3 is a graph showing the time-sequential change of the flow rate of fluids that flow out from the outlet of the related valve apparatus.
Figure 4:
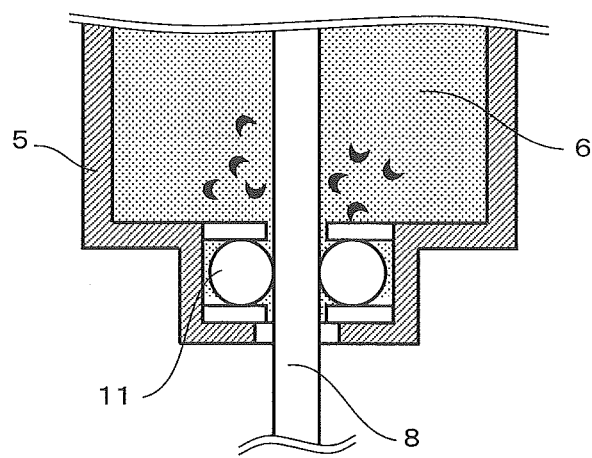
FIG. 4 is an expanded sectional view showing the periphery of the through-hole of a valve apparatus where an O-ring is used as a sealing member.
Figure 5:
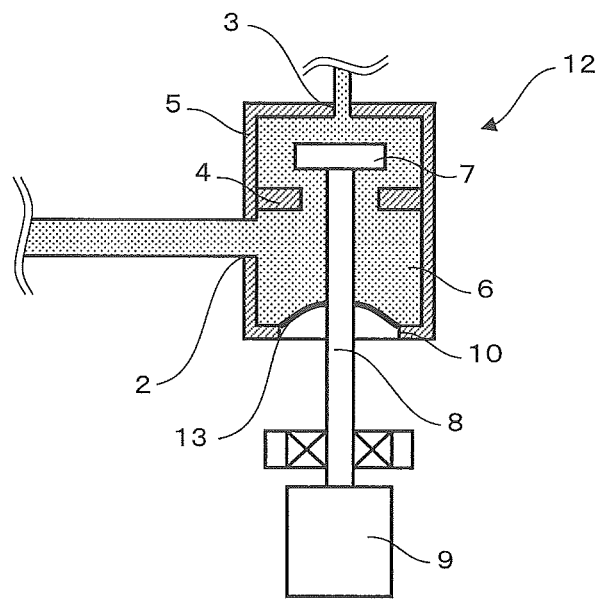
FIG. 5 is a schematic diagram showing a valve device where a flexible film is used as a sealing member.
Figure 6:
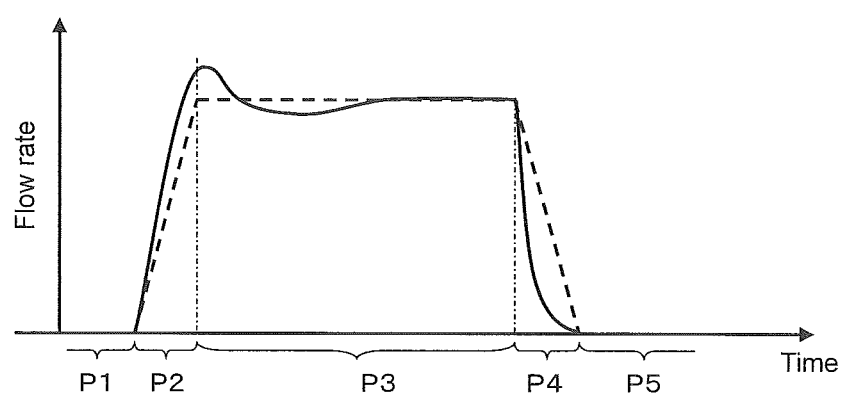
FIG. 6 is a graph showing the time-sequential change of the flow rate of fluids that flow out from the outlet of the valve apparatus shown in FIG. 5.

Hereinafter, valve apparatus according to the exemplary embodiments of the present invention will be described in detail with reference to the drawings. Among components of the valve apparatus according to the exemplary embodiments of the present invention, components similar to those shown in FIGS. 1 to 5 are denoted by similar reference numerals, and description thereof will be omitted.

First Exemplary Embodiment

Figure 7:
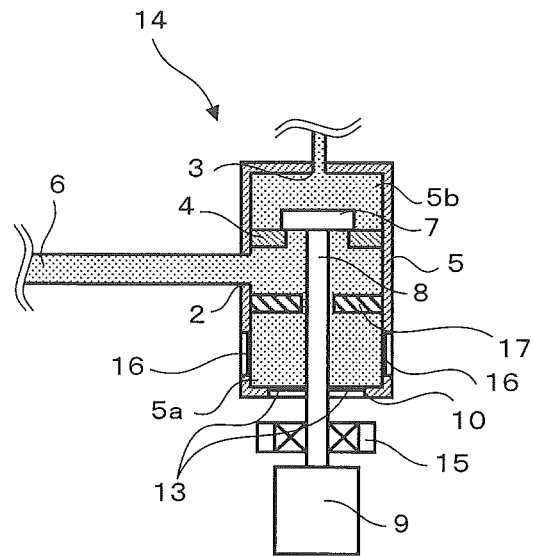
FIG. 7 is a schematic diagram showing a valve apparatus according to the first exemplary embodiment of the present invention.

FIG. 7 is a schematic diagram showing a valve apparatus according to the first exemplary embodiment of the present invention.

As shown in FIG. 7, valve apparatus 14 according to the exemplary embodiment includes valve box 5 that includes inlet 2 and outlet 3 and that forms a space for housing fluid 6. Valve seat 4 having an opening is disposed in valve box 5, and fluid 6 that flows in from inlet 2 passes through the opening to flow to outlet 3.

Valve apparatus 14 includes valve body 7 for opening/closing the opening of valve seat 4 in valve box 5. By closing the opening of valve seat 4, the flow of fluid 6 that is flowing from inlet 2 into the space in valve box 5 and that is flowing out from outlet 3 is blocked.

Valve body 7 is connected to actuator 9 disposed outside valve box 5 via valve shaft 8. Actuator 9 moves valve body 7 to open/close the opening of valve seat 4. An air cylinder or a motor can be used as actuator 9.

In the description, a state where the opening of valve seat 4 is closed is referred to as a closed state, while a state where the opening of valve seat 4 is opened is referred to as an open state.

Valve shaft 8 is inserted into through-hole 10 formed in valve box 5. Valve shaft guide 15 is disposed around valve shaft 8 located outside valve box 5. Valve shaft guide 15 restricts the moving direction of valve shaft 8 to the longitudinal direction of through-hole 10.

First flexible film 13, such as a diaphragm, is disposed in through-hole 10. An insertion hole into which valve shaft 8 is inserted is formed in first flexible film 13. The outer peripheral end of first flexible film 13 is fixed to the peripheral edge of through-hole 10, and the peripheral edge of the insertion hole of first flexible film 13 is fixed to the outer periphery of valve shaft 8. Accordingly, the gap between through-hole 10 and valve shaft 8 is completely closed by first flexible film 13.

A part of the wall of valve box 5 is formed by second flexible film 16 separate from first flexible film 13. For second flexible film 16, a diaphragm can be used.

Next, the operation of valve apparatus 14 will be described referring to FIGS. 8A and 8B.

Figure 8A:
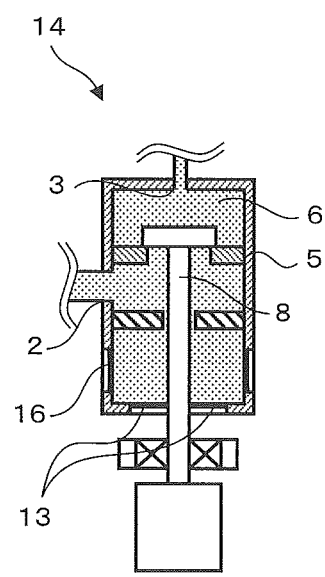
FIG. 8A is a schematic diagram showing the closed state of the valve apparatus shown in FIG. 7.

FIG. 8A is a schematic diagram showing valve apparatus 14 in the closed state. FIG. 8B is a schematic diagram showing valve apparatus 14 in the open state.

Figure 8B:
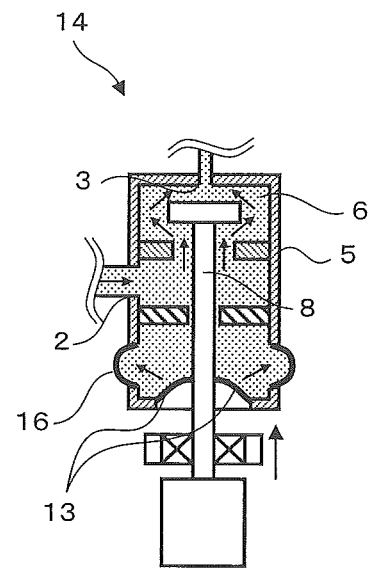
FIG. 8B is a schematic diagram showing the open state of the valve apparatus shown in FIG. 7.

As shown in FIGS. 8A and 8B, when valve apparatus 14 changes from the closed state to the open state, valve shaft 8 moves in the direction that allows it to be pushed into valve box 5. Since first flexible film 13 is fixed to valve shaft 8, first flexible film 13 is also pushed into valve box 5 accompanying the movement of valve shaft 8. In other words, first flexible film 13 is deformed in a direction that reduces the volume of valve box 5.

The reduction of the volume of valve box 5 is accompanied by an increase of pressure of fluid 6 in valve box 5. As a result, second flexible film 16 is deformed in the direction that allows it to be pulled out of valve box 5, in other words, in a direction for increasing the volume of valve box 5. Since first flexible film 13 is deformed in the direction that reduces the volume of valve box 5, and since second flexible film 16 is deformed in the direction that increases the volume of valve box 5, almost no fluctuation occurs in the volume of valve box 5.

When valve apparatus 14 changes from the open state to the closed state, valve shaft 8 moves in the direction that allows it to be pulled out of valve box 5. First flexible film 13 is deformed in the direction that increases the volume of valve box 5.

The increase of the volume of valve box 5 is accompanied by a reduction of pressure of fluid 6 in valve box 5. As a result, second flexible film 16 is deformed in the direction that allows it to be pushed into valve box 5, in other words, in a direction that reduces the volume of valve box 5. Since first flexible film 13 is deformed in the direction that increases the volume of valve box 5, and second flexible film 16 is deformed in the direction that reduces the volume of valve box 5, almost no fluctuation occurs in the volume of valve box 5.

Thus, even when valve shaft 8 moves in the direction that allows it to be pushed into valve box 5 and when valve shaft 8 moves in the direction that allows it to being pulled out of valve box 5, the volume of valve box 5 is not changed. Thus, in valve apparatus 14 according to the exemplary embodiment, even when valve shaft 8 moves, almost no fluctuation occurs in the flow rate of fluid 6 flowing out from outlet 3 of valve apparatus 14.

Valve apparatus 14 according to the exemplary embodiment further includes, as shown in FIG. 7, partition plate 17 for partitioning the inside of valve box 5 into first chamber 5a and second chamber 5b. A hole is formed in partition plate 17, and valve shaft 8 is inserted into the hole.

First chamber 5a is formed by the wall of valve box 5 including first and second flexible films 13 and 16, and partition plate 17. Second chamber 5b is formed by the wall of valve box 5 including inlet 2 and outlet 3, and partition plate 17.

When first flexible film 13 is deformed to increase the pressure of fluid 6 in first chamber 5a, second flexible film 16 is deformed in the direction that allows it to be pulled out of valve box 5. As a result, the pressure of fluid 6 in first chamber 5a drops back to the original value. In other words, even when first flexible film 13 is deformed, almost no change occurs in the pressure of fluid 6 in first chamber 5a.

First chamber 5a and second chamber 5b are partitioned by partition plate 17. Accordingly, even when first flexible film 13 is deformed in the direction that allows it to be pushed into valve box 5, fluid 6 in first chamber 5a flows toward second chamber 5b. In other words, it is difficult for fluctuation in the pressure of fluid 6 in first chamber 5a to be transmitted to second chamber 5b. Thus, fluctuation in the flow rate of fluid 6 that flows out from outlet 3 of valve apparatus 14 can be further prevented.

No sealing member such as an O-ring is disposed in the gap between the hole of partition plate 17 and valve shaft 8. Accordingly, valve shaft 8 is not worn. As a result, the incursion of wear debris generated by the abrasion of valve shaft 8 is not brought about.

The gap between the hole of partition plate 17 and valve shaft 8 is preferably set to a size such that fluctuation in the pressure of fluid 6 is not transmitted from first chamber 5a to second chamber 5b, for example, about 100 μm.

Further, second flexible film 16 is desirably designed by a material and with a size that can be more easily deformed than first flexible film 13. For example, second flexible film 16 may be formed by using a material having an elastic modulus that is smaller than that of first flexible film 13, or the area of second flexible film 16 may be set to be larger than that of first flexible film 13.

Such a design facilitates deformation of second flexible film 16 that corresponds to fluctuation in the pressure of fluid 6 in first chamber 5a that is caused by the deformation of first flexible film 13, and the fluctuation in pressure can be prevented. As a result, fluctuation in the flow rate of fluid 6 from outlet 3 of valve apparatus 14 is further prevented.

Second Exemplary Embodiment

Figure 9A:
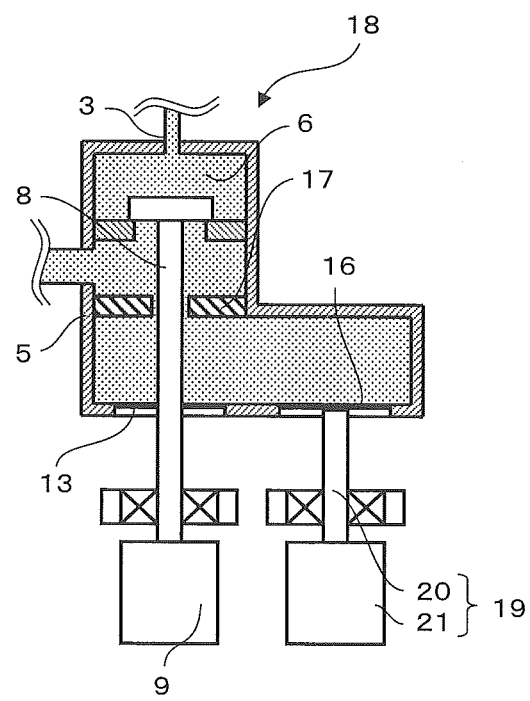
FIG. 9A is a schematic diagram showing the closed state of a valve apparatus according to the second exemplary embodiment of the present invention.
Figure 9B:
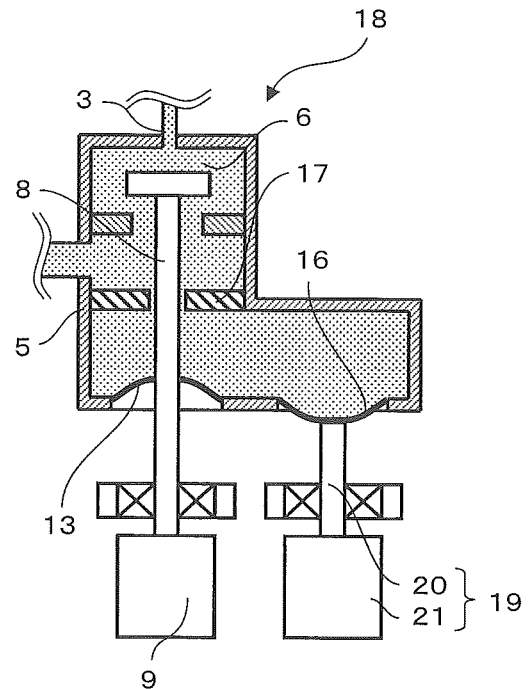
FIG. 9B is a schematic diagram showing the open state of the valve apparatus according to the second exemplary embodiment of the present invention.

Next, a valve apparatus according to the second exemplary embodiment of the present invention will be described, referring to FIGS. 9A and 9B. FIG. 9A is a schematic diagram showing the closed state of valve apparatus 18 according to the exemplary embodiment. FIG. 9B is a schematic diagram showing the open state of valve apparatus 18.

Components similar to those of valve apparatus 14 according to the first exemplary embodiment are denoted by similar reference numerals, and description thereof will be omitted.

As shown in FIGS. 9A and 9B, valve apparatus 18 has deformation mechanism 19 for deforming second flexible film 16. Deformation mechanism 19 includes actuator 21 connected to second flexible film 16 via rod member 20.

Actuator 21 is connected to control means not shown, and deforms second flexible film 16 interlockingly with the operation of actuator 9. When actuator 9 pushes valve shaft 8 into valve box 5, actuator 21 deforms second flexible film 16 in a direction that allows second flexible film 16 to be pulled out of valve box 5. When actuator 9 pulls out valve shaft 8 from valve box 5, actuator 21 defaults second flexible film 16 in a direction that allows second flexible film 16 to be pushed into valve box 5.

In other words, second flexible film 16 is deformed in a direction opposite the deforming direction of first flexible film 13.

"The direction opposite the deforming direction of first flexible film 13" means the following direction. A direction that is opposite to the pushing-in direction for pushing first flexible film 13 into valve box 5 is a direction for pulling out from valve box 5. A direction that is opposite to the pulling out direction for pulling out first flexible film 13 from valve box 5 is a direction for pushing first flexible film 13 into valve box 5.

The movement of valve shaft 8, in other words, the deformation of first flexible film 13, is accompanied by deformation of second flexible film 16 by deformation mechanism 19. Accordingly, the volume of valve box 5 is not changed. Thus, in valve apparatus 18, according to the exemplary embodiment, even when valve shaft 8 moves, fluctuation in the flow rate of fluid 6 that flows out from outlet 3 of valve apparatus 18 is prevented.

Figure 10:
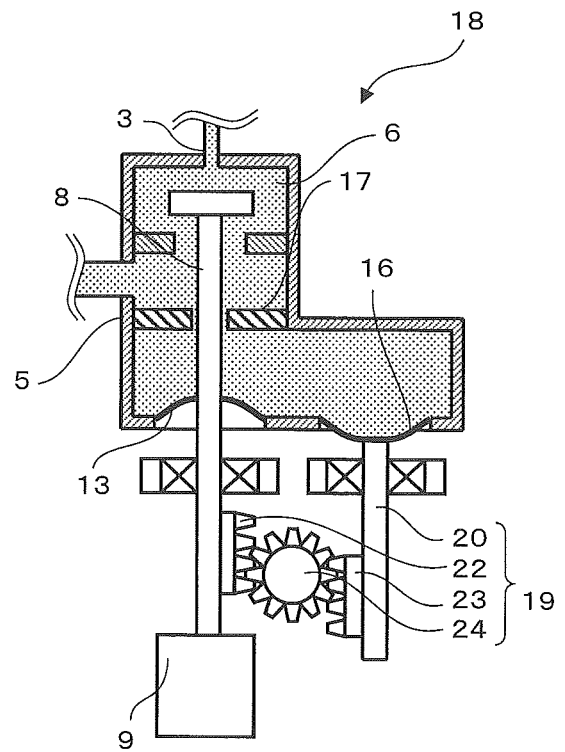
FIG. 10 is a schematic diagram showing a valve apparatus where a rack and pinion mechanism is used as a deformation mechanism.

As deformation mechanism 19, a mechanism using a pinion or a rack, or a link mechanism can be employed. FIG. 10 is a schematic diagram showing valve apparatus 18 where a pinion and a rack are used as deformation mechanism 19.

As shown in FIG. 10, first rack 22 is disposed in valve shaft 18, and second rack 23 is disposed in second flexible film 16.

The teeth of first and second racks 22 and 23 are arrayed in the axial direction of valve shaft 8.

Pinion 24 is disposed between first and second racks 22 and 23, and the movement of first rack 22 is transmitted to second rack 23 via pinion 24. Accordingly, the movement of valve shaft 8, in other words, the deformation of first flexible film 13, is accompanied by the movement of second rack 23, thereby deforming second flexible film 16.

Figure 11:
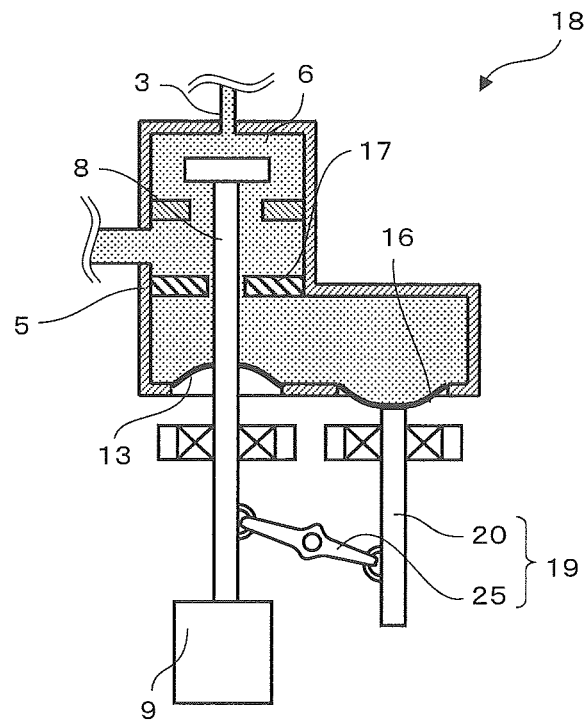
FIG. 11 is a schematic diagram showing a valve apparatus where a link mechanism is used as a deformation mechanism.

FIG. 11 is a schematic diagram showing valve apparatus 18 where a link mechanism is used as deformation mechanism 19. As shown in FIG. 11, second flexible film 16 includes rod member 20 that extends in the moving direction of valve shaft 8. Valve shaft 8 and rod member 20 are connected via link member 25.

Link member 25, which has a rod shape, is disposed to be rotatable around one place in the axial direction of the rod shape. When rod member 20 moves, link member 25 rotates around the place, and rod member 20 moves in a direction opposite the moving direction of valve shaft 8. As a result, second flexible film 16 is deformed in a direction opposite first flexible film 13.

The deformation of second flexible film 16 in the direction opposite first flexible film 13 prevents fluctuation in the volume of valve box 5. Thus, even when valve shaft 8 moves, fluctuation in the flow rate of fluid 6 that flows out from outlet 3 of valve apparatus 18 is prevented.

In valve apparatus 18 that uses the rack and pinion mechanism or the link mechanism as deformation mechanism 19 (FIGS. 10 and 11), second flexible film 16 can be deformed by actuator 9 in order to move valve shaft 8. Thus, actuator 21 shown in FIGS. 9A and 9B is not necessary. The rack and pinion mechanism or the link mechanism can be realized more inexpensively than the actuator, and the manufacturing costs of valve apparatus 18 can be reduced.

Third Exemplary Embodiment

Figure 12:
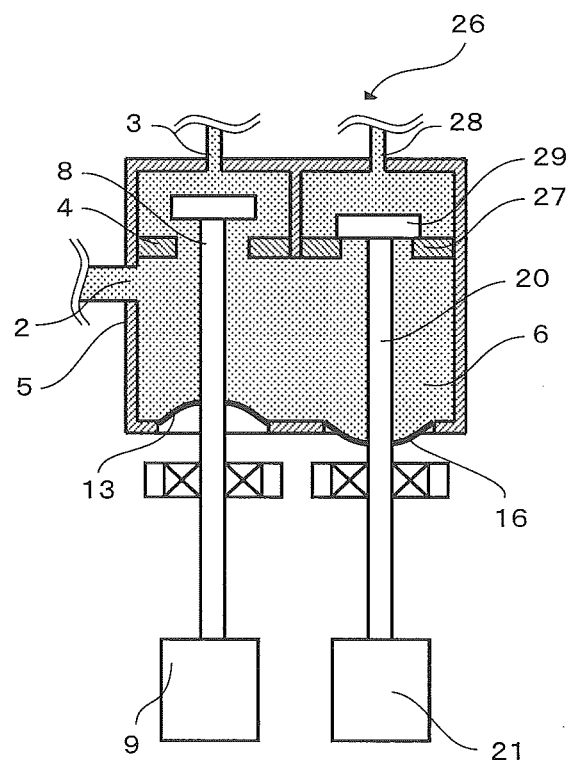
FIG. 12 is a schematic diagram showing a valve apparatus according to the third exemplary embodiment of the present invention.
Figure 13:
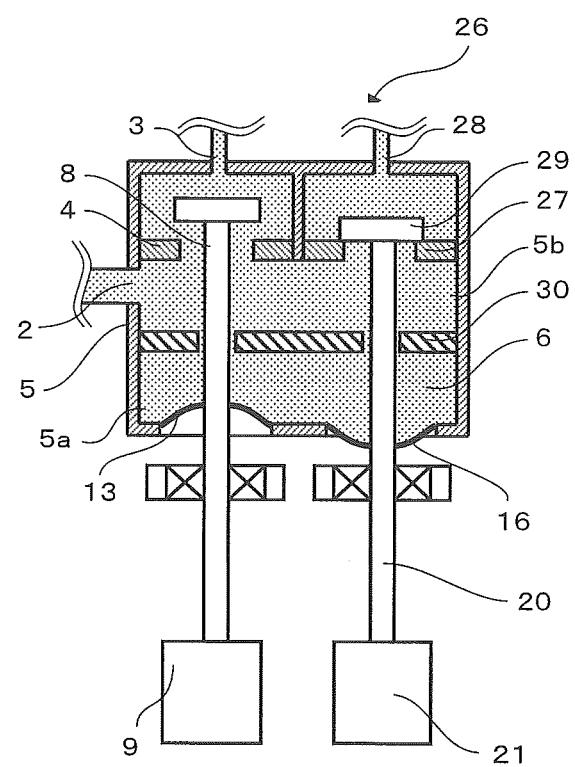
FIG. 13 is a schematic diagram showing a valve apparatus according to the modified example of the third exemplary embodiment.

Next, a valve apparatus according to the third exemplary embodiment of the present invention will be described, referring to FIG. 12. FIG. 12 is a schematic diagram showing a valve apparatus according to the third exemplary embodiment of the present invention. Components similar to those of valve apparatus 14 and 18 according to the first and second exemplary embodiments are denoted by similar reference numerals, and description thereof will be omitted.

As shown in FIG. 12, valve apparatus 26 according to the exemplary embodiment includes second valve seat 27 that is different from first valve seat 4 disposed in valve box 5. An opening is formed in second valve seat 27. Valve box 5 includes second outlet 28 that is different from outlet 3. In the exemplary embodiment, outlet 3 is referred to as first outlet 3, and valve seat 4 is referred to as first valve seat 4.

The inside of valve box 5 is divided into a flow path from inlet 2 to the openings of first and second valve seats 4 and 27, a flow path from the opening of second first valve seat 4 to first outlet 3, and a flow path from the opening of second valve seat 27 to second outlet 28. In other words, liquid 6 that flowed from inlet 2 into valve box 5 flows toward the opening of first valve seat 4 or the opening of second valve seat 27. Liquid 6 that has passed through the opening of first valve seat 4 flows out from first outlet 3, and liquid 6 that has passed through the opening of second valve seat 27 flows out from second outlet 28.

Valve apparatus 26 includes second valve body 29 for opening/closing the opening of second valve seat 27 in valve box 5. By closing the opening of second valve seat 27, the flow of liquid 6 from second outlet 28 is blocked.

Second valve body 29 is connected to actuator 21 disposed outside valve box 5 via rod member 20. Actuator 21 moves second valve body 29 via rod member 20 to open/close the opening of second valve seat 27. In other words, rod member 20 functions as a second valve shaft to move second valve body 29.

An air cylinder or a motor can be used as actuator 21.

In the exemplary embodiment, second flexible film 16 includes an insertion hole into which rod member 20 is inserted. The peripheral edge of the insertion hole of second flexible film 16 is fixed to the outer periphery of rod member 20. Thus, when rod member 20 moves in a direction that intersects second flexible film 16, second flexible film 16 is deformed. In other words, rod member 20 that is connected to actuator 21 functions as a deformation mechanism to deform second flexible film 16.

Actuator 21 is connected to control means not shown, and moves rod member 20 interlockingly with the operation of actuator 9.

Specifically, when actuator 9 pushes valve shaft 8 into valve box 5, actuator 21 pulls out rod member 20 from valve box 5. When actuator 9 pulls out valve shaft 8 from valve box 5, actuator 21 pushes rod member 20 into valve box 5.

First flexible film 13 is fixed to valve shaft 8, and second flexible film 16 is fixed to rod member 20. Accordingly, the movement of valve shaft 8 and rod member 20 is accompanied by deformation of first and second flexible films 13 and 16. When valve shaft 8 is pushed into valve box 5 while rod member 20 is pulled out from valve box 5, first flexible film 13 is pushed into valve box 5 while second flexible film 16 is pulled out from valve box 5. When valve shaft 8 is pulled out from valve box 5 while rod member 20 is pushed into valve box 5, first flexible film 13 is pulled out from valve box 5 while second flexible film 16 is pushed into valve box 5.

Thus, second flexible film 16 is deformed in a direction opposite the deforming direction of first flexible film 13. As a result, in valve apparatus 18 according to the exemplary embodiment, the volume of valve box 5 is not changed even when valve shaft 8 moves. Fluctuation in the flow rate of fluid 6 that flows out from outlet 3 of valve apparatus 18 is prevented.

In a valve apparatus including pluralities of valve bodies and valve shafts, a plurality of actuators to move the valve shafts is usually disposed. In the exemplary embodiment, the plurality of flexible films is deformed by the plurality of actuators that move the valve shafts. This eliminates the necessity of disposing an actuator only for deforming the flexile films, and the manufacturing costs of the valve apparatus can be reduced.

As deformation mechanism 19, a rack and pinion mechanism or a link mechanism can be employed (refer to FIGS. 10 and 11). When the rack and pinion mechanism or the link mechanism is used as deformation mechanism 19, second flexible film 16 can be defoimed by actuator 9 to move valve shaft 8. Thus, actuator 21 shown in FIG. 12 is not necessary. The rack and pinion mechanism or the link mechanism can be realized more inexpensively than the actuator, and the manufacturing costs of valve apparatus 26 can be reduced.

The exemplary embodiment is not limited to the example shown in FIG. 12.

Specifically, in the example shown in FIG. 12, the opening of second valve seat 27 is opened by pushing rod member 20 into valve box 5, and closed by pulling out rod member 20 from valve box 5. In other words, when the opening of first valve seat 4 is switched from the closed state to the open state, the opening of second valve seat 27 is switched from the open state to the closed state. When the opening of first valve seat 4 is switched from the open state to the closed state, the opening of second valve seat 27 is switched from the closed state to the open state.

The exemplary embodiment is not limited to the valve apparatus where, when the opening of first valve seat 4 or the opening of second valve seat 27 is in a closed state, the other opening is opened. For example, the exemplary embodiment can be applied to a valve apparatus where the opening of second valve seat 27 is set in a closed state when the opening of first valve seat 4 is in a closed state, and in an open state when the opening of first valve seat 4 is in an open state.

As such a valve apparatus, there is a valve apparatus where the opening of second valve seat 27 is closed by pushing rod member 20 into valve box 5, and opened by pulling out rod member 20 from valve box 5. In this case, when the opening of first valve seat 4 is switched from the closed state to the open state, the opening of second valve seat 27 is switched from the open state to the closed state. When the opening of first valve seat 4 is switched from the open state to the closed state, the opening of second valve seat 27 is switched from the closed state to the open state.

As a mechanism for moving rod member 20, a mechanism using a pinion or a rack, or a link mechanism can be employed.

Further, as shown in 13, valve apparatus 26 can include partition plate 30 for partitioning the inside of valve box 5 into first chamber 5a, second chamber 5b, and third chamber 5c.

Valve apparatus 26 including partition plate 30 will be described.

Partition plate 30 includes a first hole into which valve shaft 8 is inserted and a second hole into which rod member 20 is inserted. First chamber 5a is formed by the wall of valve box 5 including first and second flexible films 13 and 16, and partition plate 17. Second chamber 5b is formed by the wall of valve box 5 including inlet 2 and first and second outlets 3 and 28, and partition plate 30.

First chamber 5a and second chamber 5b are partitioned by partition plate 30. Accordingly, even when first flexible film 13 is deformed in the direction that allows it to be pushed into valve box 5, fluid 6 in first chamber 5a flows toward second chamber 5b. In other words, it is difficult for fluctuation in the pressure of fluid 6 in first chamber 5a to be transmitted to second chamber 5b. Thus, fluctuation in the flow rate of fluid 6 that flows out from first and second outlets 3 and 28 of valve apparatus 26 can be further prevented.

No sealing member such as an O-ring is disposed in the gap between the first hole of partition plate 30 and valve shaft 8 or in the gap between the second hole of partition plate 30 and rod member 20. Accordingly, valve shaft 8 or rod member 20 is not worn. As a result, the occurrence of wear debris generated by the abrasion of valve shaft 8 or rod member 20 is not brought about.

The gap between the first hole of partition plate 30 and valve shaft 8 and the gap between the second hole of partition plate 30 and rod member 20 are preferably set to sizes that do not allow fluctuation in the pressure of fluid 6 in first chamber 5a to be transmitted to second chamber 5b, for example, about 100 μm.

The exemplary embodiments of the present invention have been described. However, the present invention is not limited to the exemplary embodiments. Various changes understandable to those skilled in the art can be made to the configuration and the specifics of the present invention within the technical ideas of the invention.

This application claims priority from Japanese Patent Application No. 2011-208498 filed Sep. 26, 2011, and Japanese Patent Application No. 2012-169939 filed Jul. 31, 2012 which are hereby incorporated by reference herein in their entirety.

REFERENCE NUMERALS 2 inlet
3 outlet
4 valve seat
5 valve box
6 fluid
7 valve body
8 valve shaft
10 through-hole
13 first flexible film
14 valve apparatus
16 second flexible film

The invention claimed is:

1. A valve apparatus comprising:
a valve box including an inlet and an outlet, and forming a space that houses fluids;
a valve shaft inserted into a through-hole formed in a wall of the valve box, and moved in a longitudinal direction of the through-hole to move a valve body that blocks a flow of the fluids from flowing into the space from the inlet and from flowing out from the outlet;
a first flexible film including a through-hole into which the valve shaft is inserted, an outer peripheral end of the first flexible film being fixed to a peripheral edge of the through-hole of the valve box, and the peripheral edge of the through-hole in the first flexible film being fixed to an outer periphery of the valve shaft to close a gap between the through-hole of the valve box and the valve shaft;
a second flexible film forming a part of the wall of the valve box; and
a deformation mechanism that deforms, interlockingly with the movement of the valve shaft, the second flexible film in a direction opposite a direction where the first flexible film is deformed by the movement of the valve shaft,
wherein the deformation mechanism includes a rod member fixed to the second flexible film, and the deformation mechanism deforms the second flexible film by moving the rod member, and
wherein the deformation mechanism includes a first rack disposed in the valve shaft, a second rack disposed in the rod member, and a pinion that transmits movement of the first rack in the longitudinal direction to the second rack.

2. The valve apparatus according to claim 1, further comprising a partition plate having a hole into which the valve shaft is inserted and configured to partition the space into a first chamber formed by the wall of the valve box including the first and second flexible films and a second chamber formed by the wall of the valve box including the inlet and the outlet.

3. The valve apparatus according to claim 1, wherein:
the valve box includes a second outlet separate from the first outlet;
the second flexible film includes an insertion hole into which the rod member is inserted, the peripheral edge of the hole being fixed to the outer periphery of the rod member; and
the rod member moves in a direction intersecting the second flexible film to be connected to the valve body that blocks the flow of the fluids flowing into the space from the inlet and flowing out from the second outlet.

4. The valve apparatus according to claim 3, further comprising a partition plate having a first hole into which the valve shaft is inserted and a second hole into which the rod member is inserted and configured to partition the space into a first chamber formed by the wall of the valve box including the first and second flexible films and a second chamber formed by the wall of the valve box including the inlet and the first and second outlets.

5. The valve apparatus according to claim 1, wherein the deformation mechanism includes an actuator connected to the second flexible film via the rod member.

6. The valve apparatus according to claim 1, wherein the deformation mechanism includes a link member connected to the valve shaft and the rod member.

7. The valve apparatus according to claim 6, further comprising a partition plate having a hole into which the valve shaft is inserted and configured to partition the space into a first chamber formed by the wall of the valve box including the first and second flexible films and a second chamber formed by the wall of the valve box including the inlet and the outlet.

\* \* \* \* \*